(12) United States Patent  
Takikura et al.

(10) Patent No.: US 6,382,540 B1  
(45) Date of Patent: May 7, 2002

(54) ROTOR FOR SPINNING REELS

(75) Inventors: Koji Takikura, Izumi; Seiji Myojo, Sakai; Masakazu Iwabuchi, Tondabayashi; Jun Sato, Sakai; Yoshiyuki Furomoto, Kishiwada, all of (JP)

(73) Assignee: Shimano Inc., Osaka (JP)

( * ) Notice: Subject to any disclaimer, the term of this patent is extended or adjusted under 35 U.S.C. 154(b) by 31 days.

(21) Appl. No.: 09/694,493

(22) Filed: Oct. 24, 2000

(30) Foreign Application Priority Data

Oct. 27, 1999 (JP) .......................... 11-305765  
Apr. 21, 2000 (JP) ........................ 2000-121178

(51) Int. Cl.[7] .............................................. A01K 89/01  
(52) U.S. Cl. ..................................... 242/231; 242/311  
(58) Field of Search ........................... 242/224, 231, 242/234, 310, 311; D22/140, 141

(56) References Cited

U.S. PATENT DOCUMENTS

| | | | | |
|---|---|---|---|---|
| 4,098,472 A | * | 7/1978 | Sazaki .......................... | 242/231 |
| 4,162,048 A | * | 7/1979 | Sazaki .......................... | 242/231 |
| 4,502,645 A | * | 3/1985 | Sazaki et al. ................. | 242/131 |
| 5,368,247 A | * | 11/1994 | Young ........................ | 242/231 |
| 5,558,289 A | * | 9/1996 | Hirayama et al. ........... | 242/131 |
| 5,683,051 A | * | 11/1997 | Hitomi et al. ............... | 242/311 |
| 5,820,053 A | * | 10/1998 | Takeuchi et al. ............ | 242/231 |
| 5,947,397 A | * | 9/1999 | Hitomi ........................ | 242/231 |

FOREIGN PATENT DOCUMENTS

| | | | | |
|---|---|---|---|---|
| DE | 43 03 033 A1 | 8/1993 | | |
| EP | 0 803 191 A2 | 10/1997 | | |
| EP | 0 839 445 A1 | 5/1998 | | |
| GB | 2260677 | * | 4/1993 | ............. 242/231 |

* cited by examiner

Primary Examiner—Emmanuel M. Marcelo  
(74) Attorney, Agent, or Firm—Shinjyu Global IP Counselors, LLP

(57) ABSTRACT

A spinning reel rotor whose portions that are liable to contact other objects are kept from being damaged. The rotor 3 has a rotor body 15, a bail arm 16, and a rotor cover 17. The rotor body 15 has a cylindrical section 20 that is rotatively fitted to the reel body 2, and that has a ring-like large-diameter portion 20a diametrically larger than the rest, and a pair of rotor arms 21 including a pair of connecting sections 21a extending diametrically outward from opposing circumferential surface positions rear-endwise on the large-diameter portion 20a and a pair of arms 21b extending forward spaced apart from the cylindrical section 20. The bail arm is pivotally fitted tip-endwise to the pair of rotor arms 21, and is for guiding and fishing line onto the spool. The rotor cover 17 is a member fitted so as to cover the large-diameter portion and external exposed surfaces of the pair of connecting sections, and to allow detachment from and reattachment to the rotor body 15.

20 Claims, 13 Drawing Sheets

ROTOR FOR SPINNING REELS

BACKGROUND OF THE INVENTION

1. Technical Field

The present invention relates to rotors, and more particularly relates to spinning reel rotors for guiding and winding fishing line onto the spool rotatively fitted to the body of the reel.

2. Description of Related Art

Spinning reels in general have a reel main unit for attachment to a fishing rod, a fishing-line-guiding rotor rotatively fitted to the reel main unit, and a spool onto which fishing line, guided by the rotor, is wound. The rotor includes a rotor body to which a bail arm is pivotally fitted. The rotor body has a cylindrical section rotatively fitted to the body of the reel, and a pair of rotor arms. The rotor arms include a pair of connecting sections that extend outward diametrically from the rear end of the cylindrical section, and a pair of arms bent from the pair of connecting sections and each extending forward spaced apart from the cylindrical section. Part of the cylindrical section is a large-diameter ring-shaped portion diametrically larger than the rest, and in opposing circumferential surface positions on the large-diameter portion the pair of connecting sections extends diametrically outward. The bail arm guides fishing line onto the spool.

With this type of spinning reel, rotating the handle rotates the rotor and fishing line is wound onto the spool with the bail arm guiding the fishing line onto the spool.

In the foregoing conventional spinning reel, the bends at the border of the rotor connecting sections and the arms, and the outer circumferential surface of the large-diameter portion are likely to scrape other things. For example, leaving the spinning reel on something hard such as a wharf, embankment, rocky place, or beach, sometimes damages the border sections and large-diameter portion that scrape on hard material. In particular, damage to a rotor made of metal such as magnesium alloy that is liable to corrode tends to make the oxide-film, coating-film, or like corrosion-resistant layer formed on its surface peel off, through which portions corrosion is likely.

SUMMARY OF THE INVENTION

An object of the present invention is to make damage unlikely to those portions of the rotor liable to scrape on other things.

A spinning reel rotor as determined by a first aspect of the invention is a device which guides and winds fishing line onto the spool, and is provided with a rotor body, a bail arm, and a first cover member. The rotor body has a cylindrical section rotatively fitted to the reel main unit, and a pair of rotor arms including a pair of connecting sections extending diametrically outward from opposing circumferential surface positions rear-endwise on the cylindrical section and a pair of arms bent from the pair of connecting sections and each extending forward spaced apart from the cylindrical section. A bail arm is pivotally fitted tip-endwise to the pair of rotor arms, and is for guiding fishing line onto the spool. The first cover member is fitted so as to cover the cylindrical section rear-endwise and at least part of external exposed surfaces of the pair of connecting sections, and to allow detachment from and reattachment to the rotor body.

With this rotor, the first cover member is fitted so as to cover the large-diameter portion and at least part of external exposed surfaces of the pair of connecting sections. The first cover member is detachable from/attachable to the rotor body. Covering the cylindrical section rear-endwise and at least those portions of the pair of connecting sections likely to scrape on things, makes it less likely that the rotor will be damaged. Furthermore, because the first cover member is detachable/attachable, should the first cover member be damaged or broken it is easily replaced.

A spinning reel rotor as determined by a second aspect is the rotor set forth in the first aspect, further wherein the cylindrical section on the circumferential surface rear-endwise has a large-diameter portion diametrically larger than the rest, and the first cover member is fitted so as to cover the large-diameter portion and at least part of external exposed surfaces of the pair of connecting sections, and to allow detachment from and reattachment to the rotor body. In this case, rotor strength is improved because the thicker large-diameter portion is provided on the thin cylindrical section where it connects with the rotor arms The spinning reel rotor as determined by a third aspect is the rotor set forth in the first or second aspect of the invention, yet further wherein the rotor has a pair of second cover members fitted so as to cover external exposed surfaces of the pair of arms, and individually to allow detachment from and reattachment to either arm. In this case, the external exposed surfaces of the arms also are covered by the second cover members, and thus the rotor less likely to be damaged.

The spinning reel rotor as determined by a fourth aspect is the rotor set forth in the third aspect, wherein the first cover member and the pair of second covers are unitarily formed. In this case, the cover unit is easily attached since the first, and the pair of second, cover members are formed unitarily.

The spinning reel rotor as determined by a fifth aspect is the rotor set forth in the third aspect, wherein the first cover member and the pair of second cover members are fitted separately to the rotor body. In this case, though attachment may be a bother, fitting cover members separately to the rotor body enables replacement when damaged of only the damaged cover member.

The spinning reel rotor as determined by a sixth aspect of the invention is the rotor set forth in the third aspect, wherein a third cover member covering the first cover member is provided. The first cover member and a portion of the pair of second cover members are unitarily formed, and the third cover member and the remaining portion of the pair of second cover members are unitarily formed. In this case, since the first cover member is covered by the third cover member, the components for attaching the first cover to the rotor body are hidden, improving the design.

The spinning reel rotor as determined by a seventh aspect is the rotor set forth in any of the first to sixth aspects of the invention, wherein the rotor body is made of an aluminum alloy or a magnesium alloy. In this case, even though rotor is manufactured of these metals that corrode comparatively easily when damaged, it is protected by the cover unit, which makes it unlikely to be damaged, and makes corrosion due to damage unlikely to occur.

The spinning reel rotor as determined by an eight aspect of the invention is the rotor set forth in any of the first to seventh aspects of the invention, wherein the first cover member is made of a synthetic resin polymer. In this case, manufacturing the first cover member of synthetic resin polymer makes use of the synthetic polymer's elasticity to keep the first cover member from being damaged, and enables the entire rotor to be covered without gaps.

The spinning reel rotor as determined by a ninth aspect is the rotor set forth in any of the third to eighth aspects of the invention, wherein the second cover members are made of a synthetic resin polymer. Again in this case, manufacturing the second cover members of synthetic resin polymer makes use of the synthetic polymer's elasticity to keep the second cover member from being damaged, and enables the arms to be covered without gaps.

The spinning reel rotor as determined by a tenth aspect of the invention is the rotor set forth in any of the first to seventh or ninth aspects, wherein the first cover member is made of a stainless steel alloy. In this case, manufacturing the first cover member of comparatively hard stainless steel alloy that does not corrode easily keeps the first cover from being damaged; moreover the luster lends it a classic feel.

The spinning reel rotor as determined by an eleventh aspect of the invention is the rotor set forth in any of the third to eighth or tenth aspects, wherein the second cover members are made of a stainless steel alloy. In this case, manufacturing the second cover members of comparatively hard stainless steel alloy that does not corrode easily keeps the second cover from being damaged; moreover the luster lends it a classic feel.

The spinning reel rotor as determined by a twelfth aspect is the rotor set forth in any of the first to seventh, ninth, or eleventh aspects, wherein the first cover member is made of an aluminum alloy. Herein, though the rotor body is made of metal like magnesium alloys that is liable to corrode electrolytically, by manufacturing the first cover member of an aluminum alloy, whose ionization tendency is near that of magnesium alloys, electrolytic corrosion due to contact between the two is unlikely to occur.

The spinning reel rotor as determined by a thirteenth aspect of the invention is the rotor set forth in any of the third to eighth, tenth, or twelfth aspects, wherein the second cover members are made of an aluminum alloy. Herein, though the rotor body is made of metal like magnesium alloys that is liable to corrode electrolytically, by manufacturing the second cover members of an aluminum alloy, whose ionization tendency is near that of magnesium alloys, electrolytic corrosion due to contact between the two is unlikely to occur.

The spinning reel rotor as determined by a fourteenth aspect is the rotor set forth in the tenth or eleventh aspects, wherein spacer members made of a dielectric synthetic resin polymer and interposed between the rotor body and the first or second cover member are furnished. In this case, interposing spacer members made of a dielectric synthetic polymer in between the rotor body and the first or second cover members means that the rotor body and the first or second cover members are not in direct contact. Therefore, though the rotor body is made of metal like magnesium alloys that is liable to corrode electrolytically, irrespective of the material properties of the cover unit electrolytic corrosion of the rotor body is unlikely to occur.

The spinning reel rotor as determined by a fifteenth aspect of the invention is the rotor set forth in any of the third to fourteenth aspects, yet further, in at least one or the other of the rotor-body covering portions of the first cover member and the second cover member, either end in widthwise cross-section intersecting the surface protrudes more than either end widthwise of the rotor body. In this case, since the cover protrudes more than the rotor body, the cover unit contacts other objects when the spinning reel is laid down, which keeps the rotor body out of contact with objects. The rotor body is therefore protected, further keeping it from being damaged.

The spinning reel rotor as determined by a sixteenth aspect is the rotor set forth in any of the third to fifteenth aspects, wherein at least either the first cover member or the pair of second cover members is joined on from the rotor body side. In this case, threaded holes need not be provided on the exposed outside portion of the cover unit, since the cover unit is joined on from the rotor body side. This makes the exposed exterior surface smooth, keeps debris from sticking to the surface, and lends a pleasant appearance to the design.

The spinning reel rotor as determined by a seventeenth aspect of the invention is the rotor set forth in any of the third to sixteenth aspects, wherein at least either the first cover member or the pair of second cover members is fitted to the rotor by tongue-and-groove engagement to permit detachment and reattachment. In this case, threaded holes need not be provided on the exposed outside portion of the cover unit, since the cover unit is detachably attached by the tongue-and-groove engagement. This makes the exposed exterior surface smooth, keeps debris from sticking to the surface, and lends a pleasant appearance to the design.

The spinning reel rotor as determined by an eighteenth aspect is the rotor set forth in any of the third to seventeenth aspects, wherein at least either the first cover member or the pair of second cover members is attached to the rotor by elastic press-fitting engagement to permit detachment and reattachment. Herein, the press-fitting engagement enables the two components to be fastened together easily and securely.

The spinning reel rotor as determined by a nineteenth aspect of the invention is the rotor set forth in any of the third to eighteenth aspects, wherein at least either the first cover member or the pair of second cover members is joined to the rotor in a plurality of places by stop-screws. This keeps the first and second cover members from lifting off the rotor.

The spinning reel rotor as determined by a twentieth aspect is the rotor set forth in any of the third to nineteenth aspects, wherein either one of the first cover member or the pair of second cover members has a lift-stop that stops the other from lifting. In this case, the second cover member pressing on a lift-stop formed on the first cover member, for example, securely prevents the one of the first and second cover members from lifting off the other.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
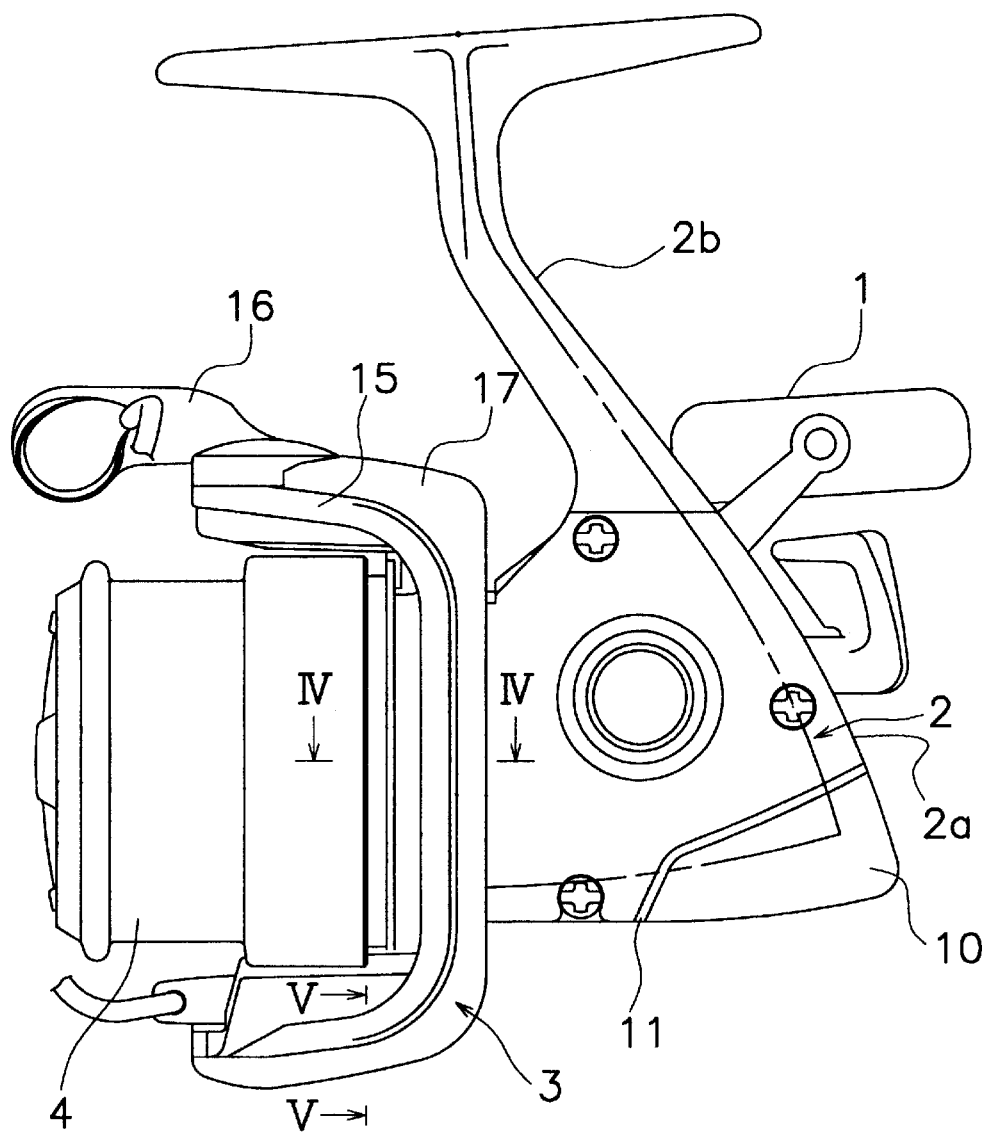
FIG. 1 is a lateral face view of a spinning reel in which an embodiment of the present invention is adopted.

FIG. 1 shows a spinning reel in which an embodiment of the present invention is employed. The reel is furnished with a reel body 2 for attachment to a fishing rod and having a handle 1; a rotor 3 disposed forward on the reel body 2; and a spool 4 disposed forward on the rotor 3. The rotor 3 is rotatively fitted to the reel body 2. The spool 4 is fitted to the reel body to enable reciprocating movement.

The reel body 2 is made of, for example, a magnesium alloy, and comprises a reel body 2a and an approximately T-shaped rod attachment part 2b that extends upward to the reel main unit shown in FIG. 1. Inside of the reel body 2a are provided a rotation transmission mechanism (not shown) and an oscillating mechanism (not shown) for moving the spool 4 back and forth in unison with the rotation of the rotor 3 of the handle 1. The lower rear end of the reel body 2a is a protruding part protrudes backward for containing the oscillating mechanism. A cover plate 10 which is made of a hard metal such as a stainless steel alloy is provided for the protruding part. An insulation member 11 for preventing electrolytic corrosion of the reel body 2 is interposed between the cover plate 10 and the reel body 2a.

Figure 2:
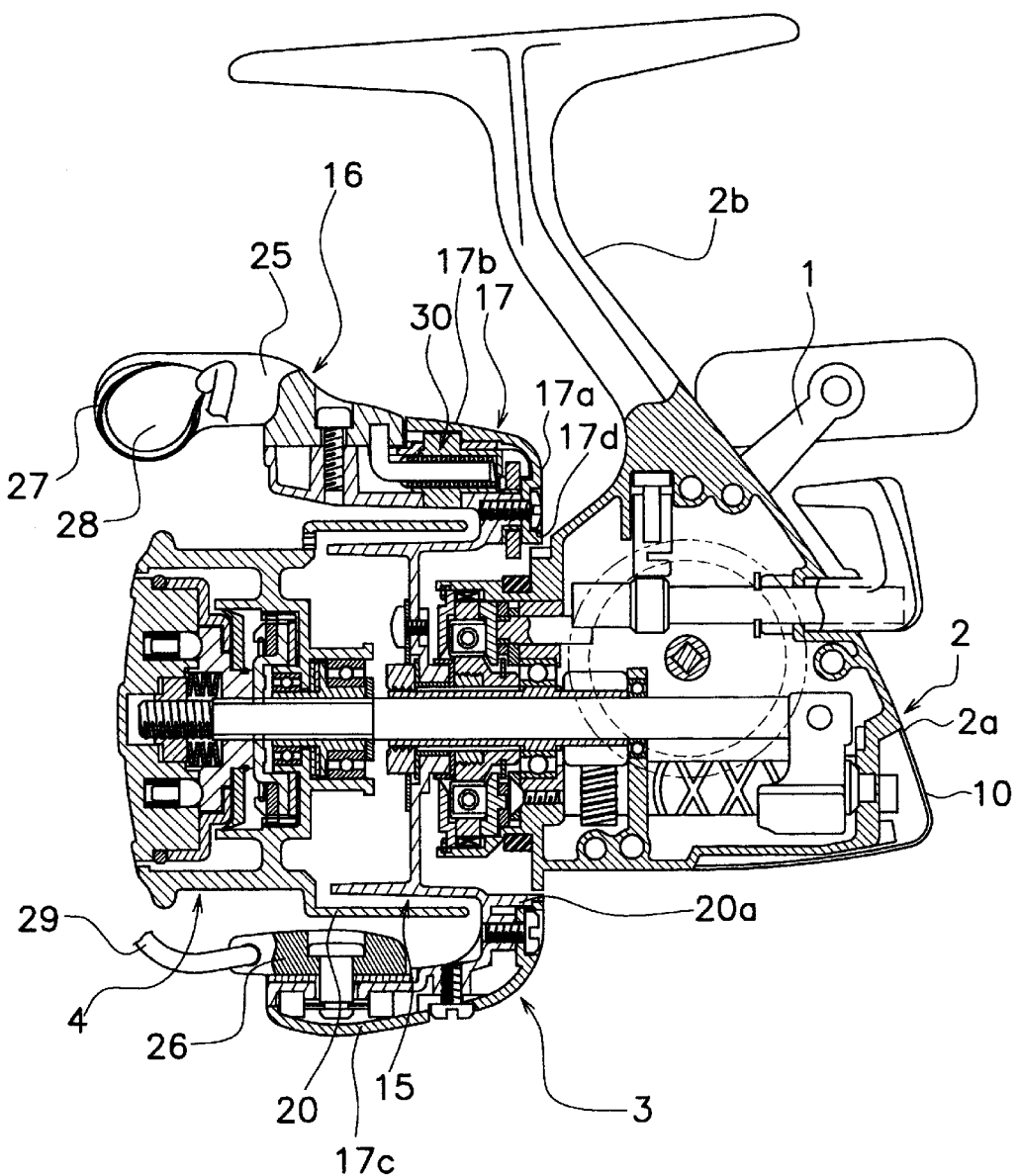
FIG. 2 is a partly in section view of the lateral face in FIG. 1.
Figure 3:
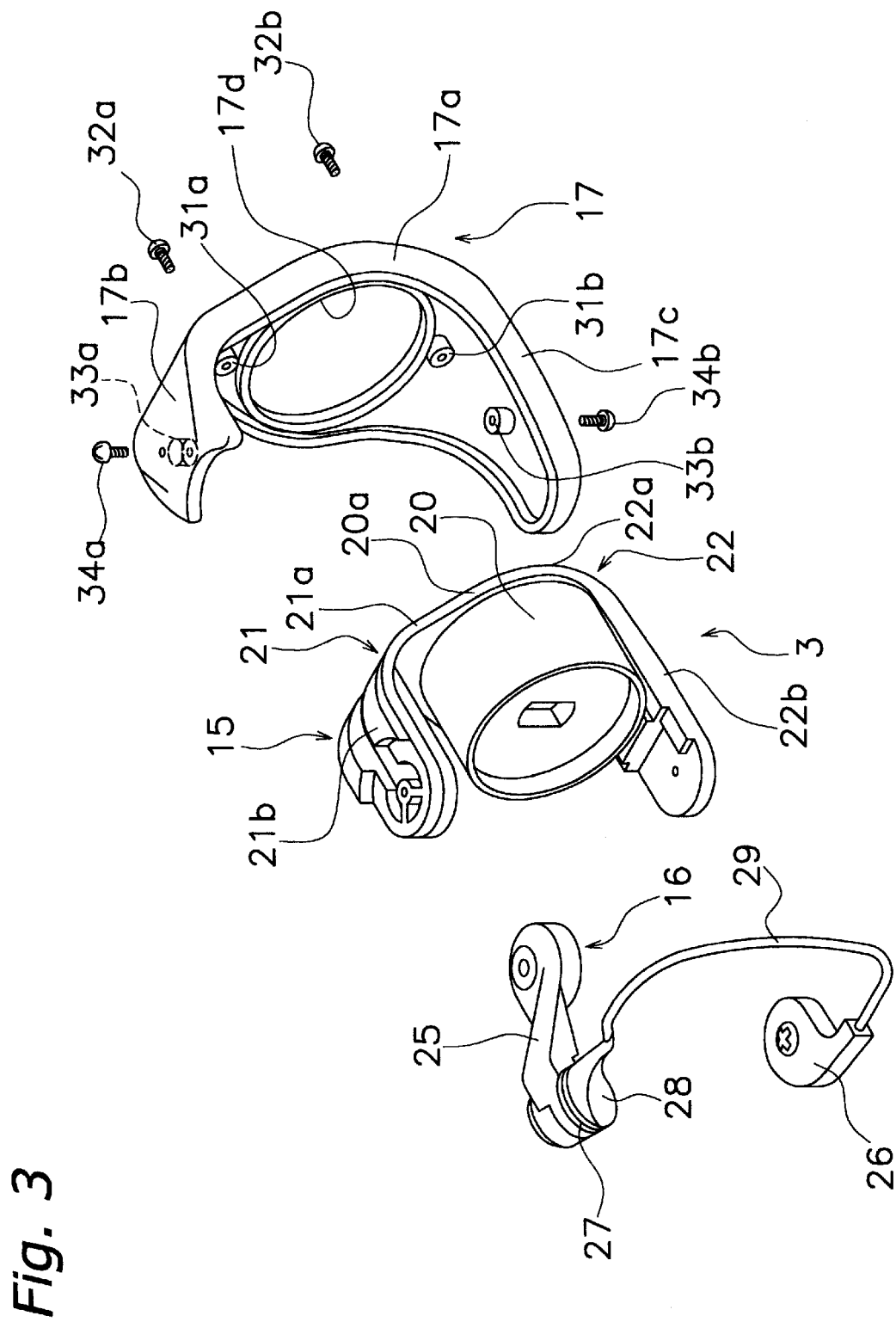
FIG. 3 is an exploded oblique view of the rotor.

As shown in FIG. 2 and FIG. 3, the rotor 3 has a rotor body 15 that is rotatively fitted to the reel body 2, a bail arm 16 that is pivotally fitted to the edge of the reel main unit, and a rotor cover 17 that is allowed to detach from and reattach to the-rotor body 15.

The rotor body 15 is made of, for example, a magnesium alloy or an aluminum alloy, and has a cylindrical section 20 and a pair of a first rotor arm 21 and a second rotor arm 22 that are unitarily formed with the cylindrical section 20 as shown in FIG. 3. The cylindrical section 20 has a ring-like large-diameter portion that is diametrically larger than the rest and is rotatively fitted to the reel body 2. The first rotor arm 21 and the second rotor arm 22 are unitarily formed on the position where the first rotor arm 21 and the second rotor arm 22 are unitarily formed on the opposing circumferential surface positions of the large-diameter portion 20a. The pair of the first rotor arm 21 and the second rotor arm 22 includes a pair of the first connecting section 21a and the second connecting section 22a extending diametrically outward from opposing circumferential surface positions on the large-diameter cylindrical section 20a and a pair of the first arm 21b and the second arm 22b bent from the pair of connecting sections and each extending forward spaced apart from the cylindrical section 20. The first connecting section 21a and the second connecting section 22a protrude taperedly diametrically outward from the largediameter cylindrical section 20a, and bend to connect to the first arm 21b and the second arm 22b. The first connecting section 21a and the second connecting section 22a, and the first arm 21b and the second arm 22b are bordered outward protrudingly, and space is formed in the external part enclosed with the border. Furthermore, in the outer space on the rotor arm side, a bail reverse mechanism is provided for keeping the bail arm 16 in line-winding position or line-releasing position and for returning line-winding position to line-releasing position. (See FIG. 2. )

The bail arm 16 is for guiding fishing line onto the spool 4. As shown in FIG. 2 and FIG. 3, the bail arm 16 has the first bail support member 25 and the second bail support member 26 pivotally fitted to each of the edges of a pair of the first rotor arm 21 and the second rotor arm 22, a line roller 27 rotatively fitted to the edge of the first bail support member, a fixed shaft cover 28 oppositely disposed between the first bail support member and the line controller 27, and a curved bail 29 made of wire rods that links the second bail support member 26 to the fixed shaft cover 28.

Figure 4:
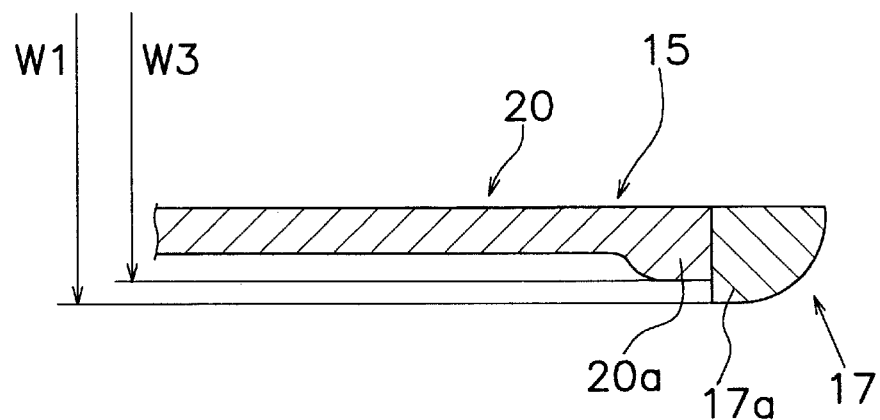
FIG. 4 is a fragmentary view in section along IV—IV in FIG. 1.
Figure 5:
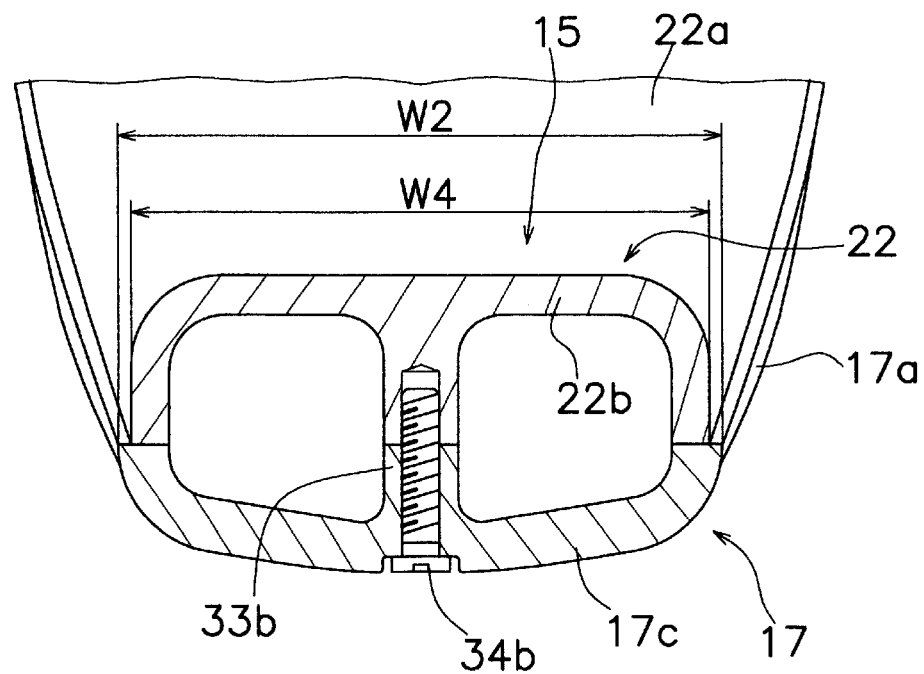
FIG. 5 is a fragmentary view in section along V—V in FIG. 1.

A rotor cover 17 is attachable to the rotor body 15 from its back (on the right side of FIG. 2) so as to cover the external space of a pair of the first rotor arm 21 and the second rotor arm 22. As shown in FIG. 4 and FIG. 5, the rotor cover 17 is attached to the rotor body 15 with its edge facing the edge of rotor body 15. The rotor cover 17 is a member made of an elastic synthetic resin such as PVC and is unlikely to be damaged. The rotor cover 17 protects parts from being damaged that are likely to contact other objects by covering them, and covers the outer space of the rotor body 15. As shown in FIG. 2 and FIG. 3, the rotor cover 17 has the first cover member 17a that covers external circumferential and rear surfaces of the large-diameter portion 20a and the external side of a pair of the first connecting section 21a and the second connecting section 22a, and a pair of second cover members 17b and 17c that extends forward from both edges of the first cover member 17a and covers the external side of a pair of the first arm 21b and the second arm 22b. At the center of the first cover member 17a, a circular opening 17d that is fit into the rear end of the cylindrical section 20 is formed. As shown in FIG. 3, boss parts 31a and 32b that has penetration holes through the opening 17d are formed and are fixed to the rotor body 15 with small screws 32a and 32b inserted into the boss parts 31a and 32b. Boss parts 33a and 33b with penetration holes are also formed in the second cover members 17b and 17c and are fixed to the rotor body 15 with small screws 34a and 34b inserted into the boss parts 33a and 33b. These small screws 32a, 32b, 34a, and 34b are made of an aluminum alloy, taking electrolytic corrosion of the rotor 3 into consideration.

As shown in FIG. 4 (first cover member 17a) and FIG. 5 (second cover member 17c), in the portions of the first cover member 17a and the second cover members 17b and 17c that cover the rotor body 15, either end in widthwise crosssection intersecting the surface protrudes more than either end widthwise of the rotor body. Specifically, width-direction dimensions of the first cover member 17a and second cover member 17c (W1 and W2) are 1 mm larger than dimensions of the large-diameter portion 20a and the rotor arm 22 (W3 and W4). Thus dimensioned, the first cover member 17a and the second cover member 17c protrude 0. 5 mm from the rotor body 15 at either edge. Also, it is preferable that dimensional difference between W1 and W2 is within the range of 0. 5 to 6 mm. If difference between the dimensions of the first cover member 17a and the second cover member 17c (W1 and W2) and those of the rotor body 15 is less than 0. 5 mm (W3 and W4), the first cover member 17a and the second cover members 17c protrude no more than 0. 25 mm, and the gap between these covers and the rotor body 15 is so short that the rotor body 15 is likely to contact other objects. If the difference exceeds 6 mm, the protrusion on both edges is so large that the gap is conspicuous and is visually undesirable, and debris is likely to remain.

Also, the second cover member 17b protrudes from both edges in the width direction of the rotor body as is the case with the first cover member 17a and the second cover member 17c.

The spool 4 is a flanged cylindrical member circumferentially onto which fishing line is wound. The spool 4 moves backward and forward synchronously with rotor 3 rotation, and uniformly winds fishing line guided by the bail arm 16 onto the circumferential surface. For the spinning reel as configured above, since the rotor cover 17 covers the external circumferential surface of the large-diameter portion 20a of the cylindrical section 20 as well as bending parts of first connecting section 21a and the second connecting section 22a, external exposed surfaces of rotor 3 is unlikely to be damaged even if the reel is put on a hard matter. Furthermore, since the rotor cover 17 protrudes against the rotor body, the rotor body 15 is unlikely to contact matters and thus to be damaged. For this reason, surface coatings and oxide layers do not peel off and the rotor body 15 is unlikely to corrode. Meanwhile, manufacturing the rotor cover of a lightweight synthetic resin reduces the overall weight of the rotor 3.

Figure 6:
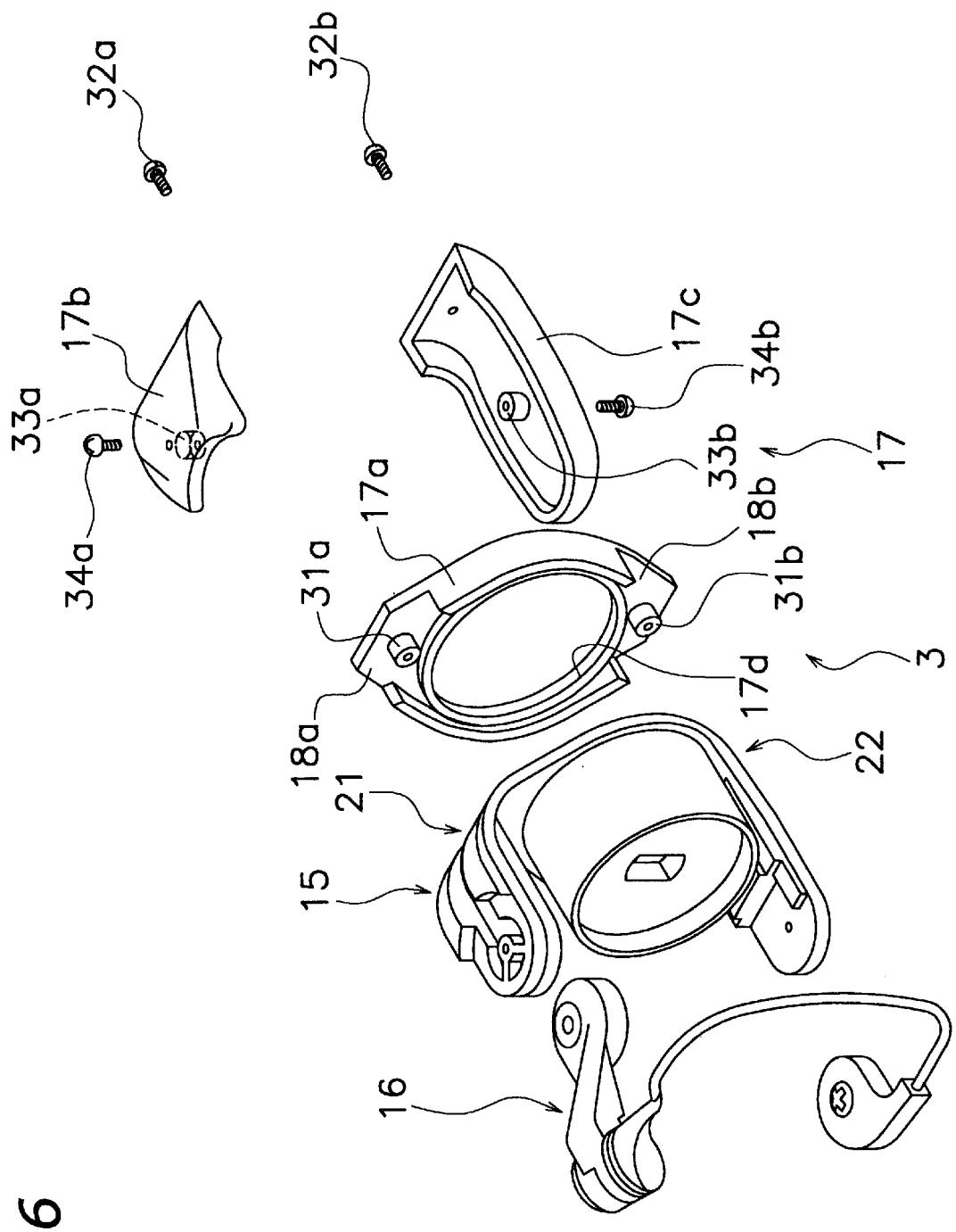
FIG. 6, 7 and 8 are views each corresponding to FIG. 3 of further respective embodiments.

(a) In the above embodiment, the first cover member 17a and a pair of the second cover members 17b and 17c are unitarily formed. However, these covers can be individually formed as shown in FIG. 6. In this case, form a pair of ear parts 18a and 18b protruding externally toward both edges of the first cover member 17a, bolt the first cover member 17a to the rotor body 15, and bolt the second cover members 17b and 17c to the first rotor arm 21 and the second rotor arm 22 so as to cover the ear parts 18a and 18b. In this case, boss parts 18a and 18b are formed in the ear parts 18a and 18b, the first cover member 17a and the second cover members 17b and 17c are bolted to the rotor body by penetrating the small screws 32a and 32b through the second cover member from the boss parts 31a and 31b. Also, the second cover members 17b and 17c are bolted with small screws 34a and 34b penetrating through the boss parts 33a and 33b.

Figure 7:
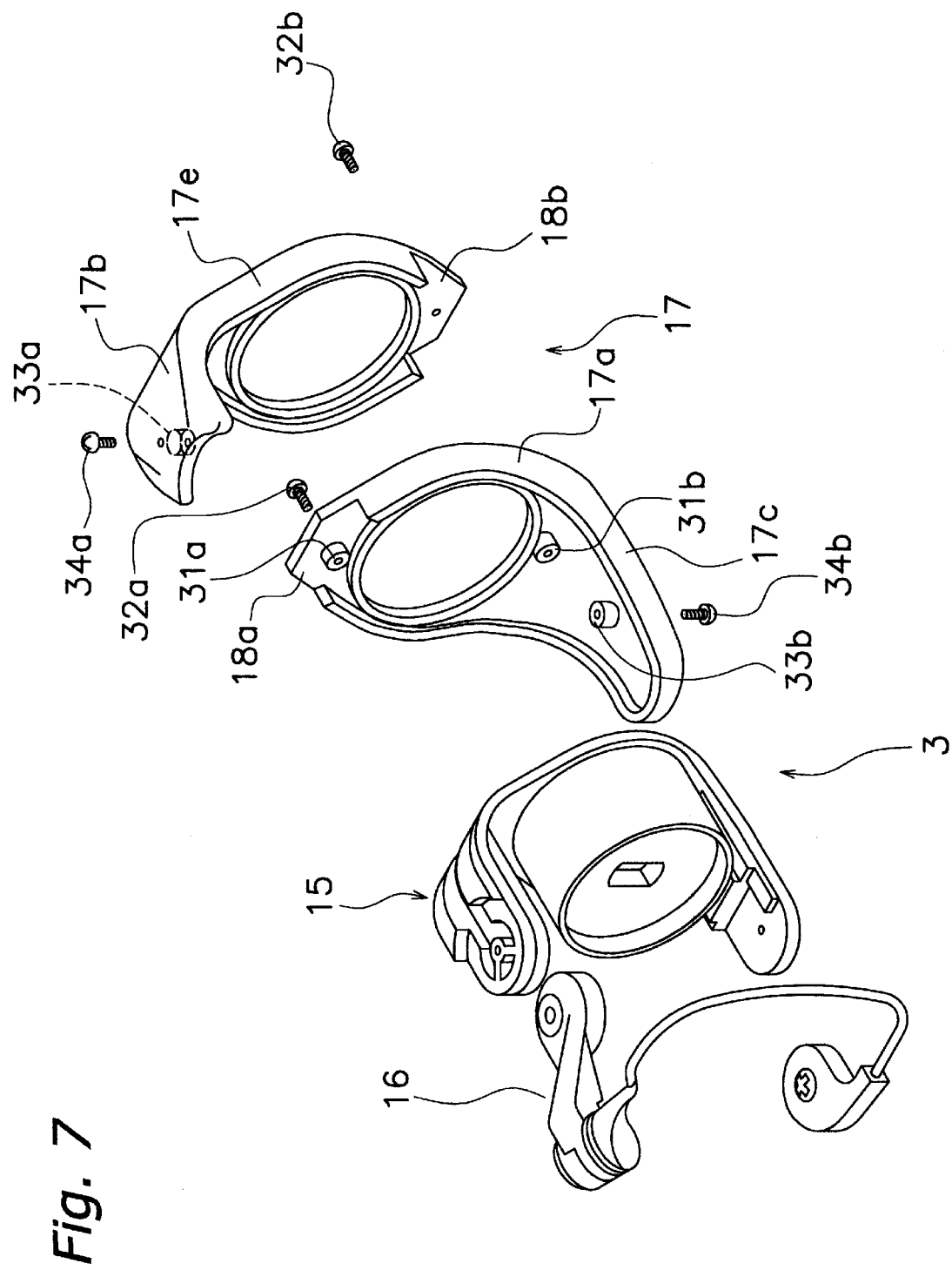

(b) As shown in FIG. 7, it is preferable that by providing a third cover 17 covering the first cover member 17a, the second cover member 17c and the first cover member 17a are unitarily formed and the second cover member and the third cover 17e are unitarily formed. In this case, the number of small screws exposed on the rear end of the rotor 3 can be reduced.

Figure 8:
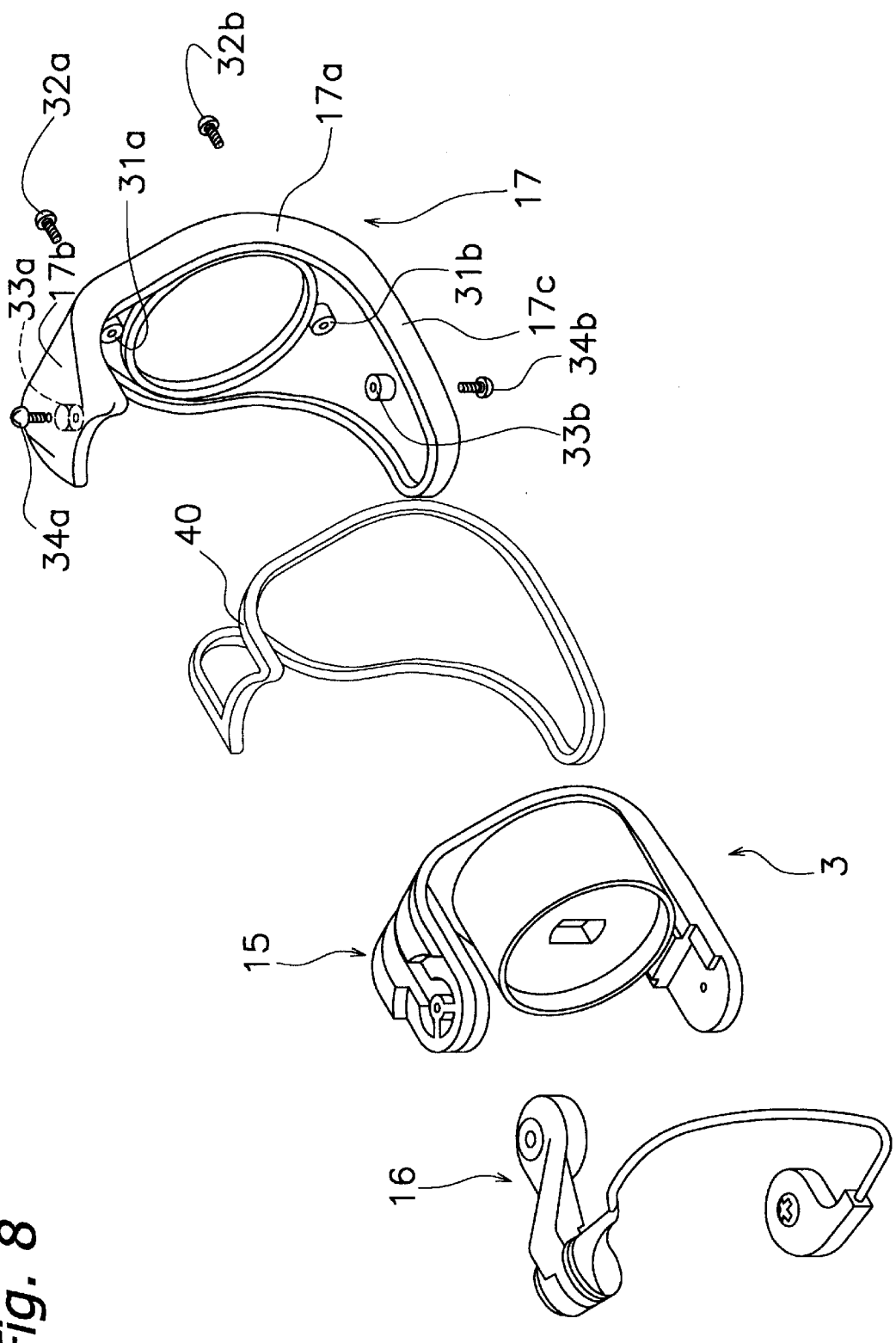

(c) In the above embodiment, the rotor cover is made of a synthetic resin. However, it can be made of an aluminum or stainless steel alloy. In this case, if the rotor body is made of a magnesium alloy, which is electrolytically corrosive, and the rotor cover is made of a stainless steel alloy, since there is much ionization between magnesium and stainless, the rotor body 15 is subject to corrosion. In this case, a spacer member 40 may suitably be installed between the rotor cover and rotor body 15 as shown in FIG. 8. The spacer member 40 is made of, for example, a dielectric synthetic resin polymer, and electrolytic corrosion of the rotor 15 can be prevented by avoiding direct contact between the rotor cover 17 and the rotor body 15.

(d) In the above embodiment, the rotor cover 17 is attached to the rotor body so as to face the edge of the rotor cover. However, the rotor cover suitably may be installed so as to overlap it on the edge of the rotor body.

Figure 9:
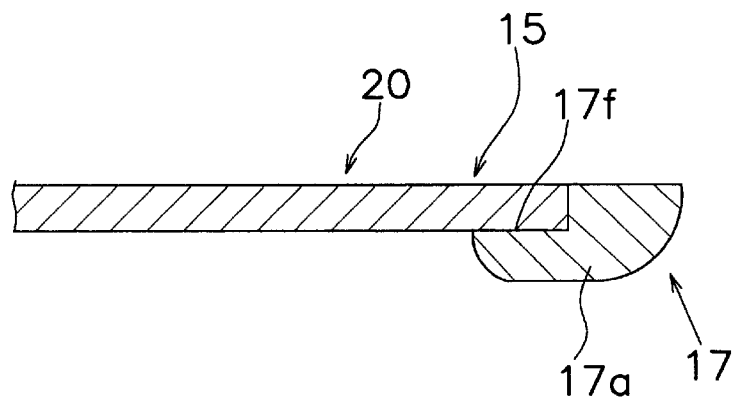
FIG. 9 is a view corresponding to FIG. 4 of another embodiment.
Figure 10:
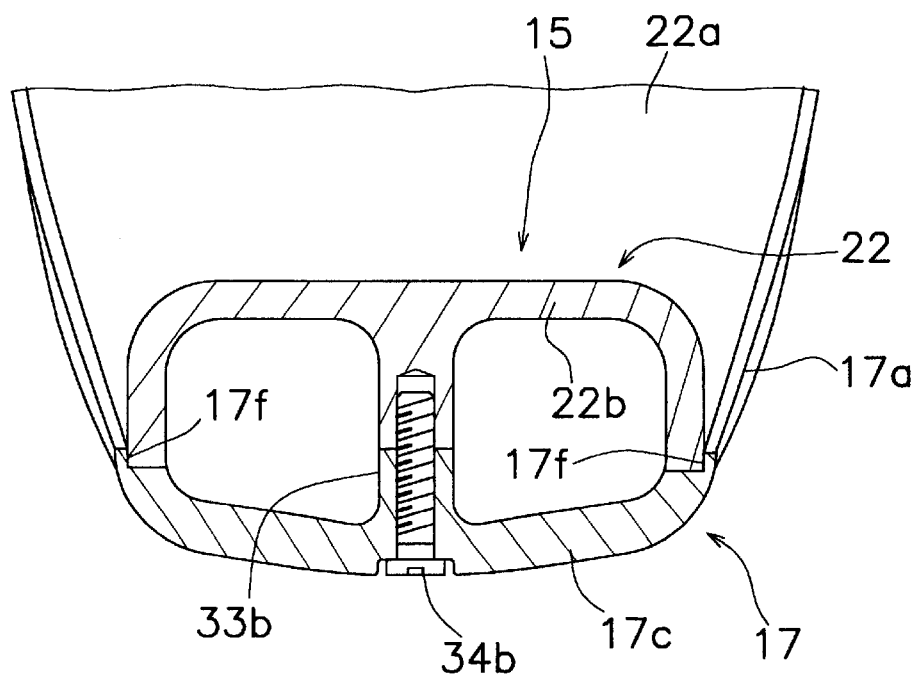
FIG. 10 is a view corresponding to FIG. 5 of the FIG. 9 embodiment.

In an embodiment shown in FIG. 9 and 10, a step part 17f is formed in the rotor cover 17 and they are overlapped So that the step part 17f covers the circumferential surface of the rotor body 15. Also, in this embodiment, no large-diameter portions are formed in the rear end of the cylindrical section of the rotor body 15 and the first cover member 17a covers the rear end of the cylindrical section 20.

Figure 11:
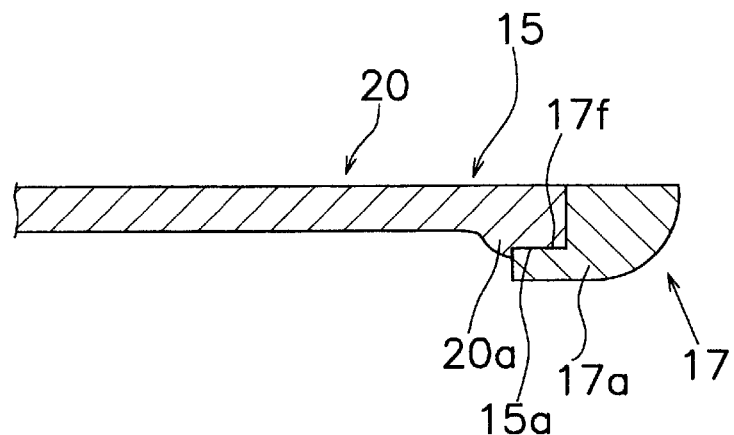
FIG. 11 is a view corresponding to FIG. 3 of another embodiment.
Figure 12:
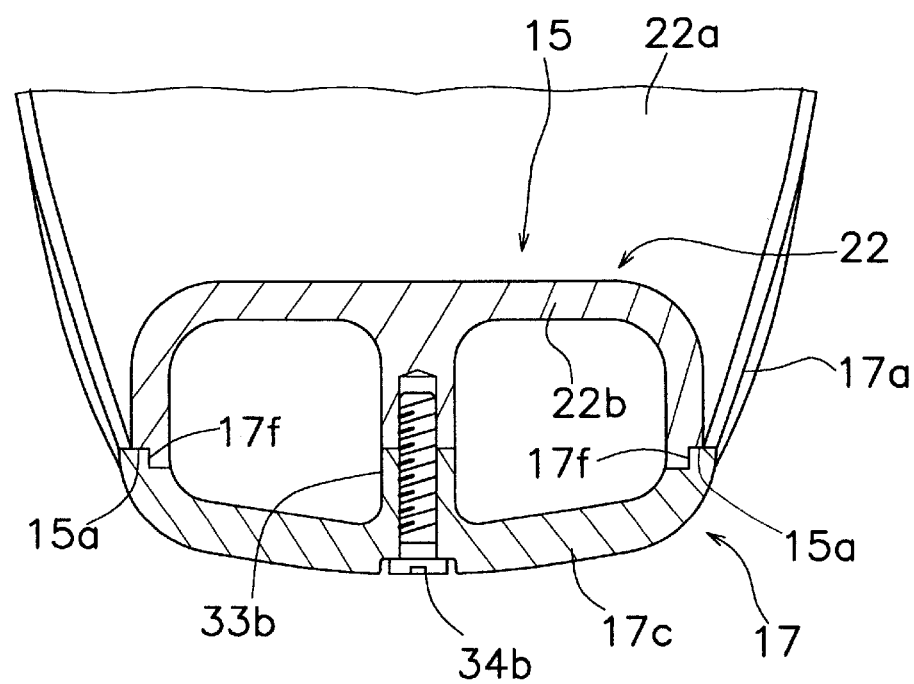
FIG. 12 is a view corresponding to FIG. 5 of the FIG. 11 embodiment.

In another embodiment as shown in FIG. 11 and 12, a step part 15a is formed in the circumferential surface of the rotor 15 and the step part 15a is covered with the step part 17f of the rotor cover 17. In this embodiment, external protrusion can be reduced compared to the embodiment as shown in FIG. 9 and FIG. 10.

(e) In the above embodiment, the rotor cover is installed on the rotor body from the rotor cover side (outside), the first cover member 17a suitably may be attached with small screws 32a and 32b from the rotor body 15 side. In this embodiment, the second cover members 17b and 17c are installed on the first arm 21b and the second arm 22b by tongue-and-groove engagement instead of small screws. Namely, a pair of protrusions 21c and 21d, or 22c and 22d is respectively formed in parallel with the rotation shaft of the rotor 3 on the arm parts 21b and 22b. The protrusions 21c, 21d, 22c, and 22d protrude inward in opposition. Meanwhile, a pair of engagement members 41, 42, 43, and 44 with engagement grooves 41a, 42a, 43a, and 44a engaging with protrusions 21c, 21d, 22c, and 22d are provided on the edge of the second cover members 17b and 17c of the rotor cover. The engagement members 41, 42, 43, and 44 are formed on the internal circumferential side in parallel with the rotation shaft of the rotor 3, protruding toward the first arm 21b and the second arm 22b, and slides to engage with the first arm 21b and the second arm 22b when the rotor cover is installed on the rotor arm 15.

Also, the second cover members 17b and 17b may be joined to the first arm 21b and the second arm 22b by small screws instead of by the tongue-and-groove engagement.

For this configuration, since there are no screws or no holes to install small screws on the outside of the rotor cover 17, the surface of the rotor cover is smooth, a pleasant design is attained, and debris are unlikely to adhere.

(f) In the above embodiment, the entire external surface of the rotor body is covered with the rotor cover 17. However, at least either of the large-diameter part that is likely to contact other objects or the pair of connecting sections may be covered.

Figure 15:
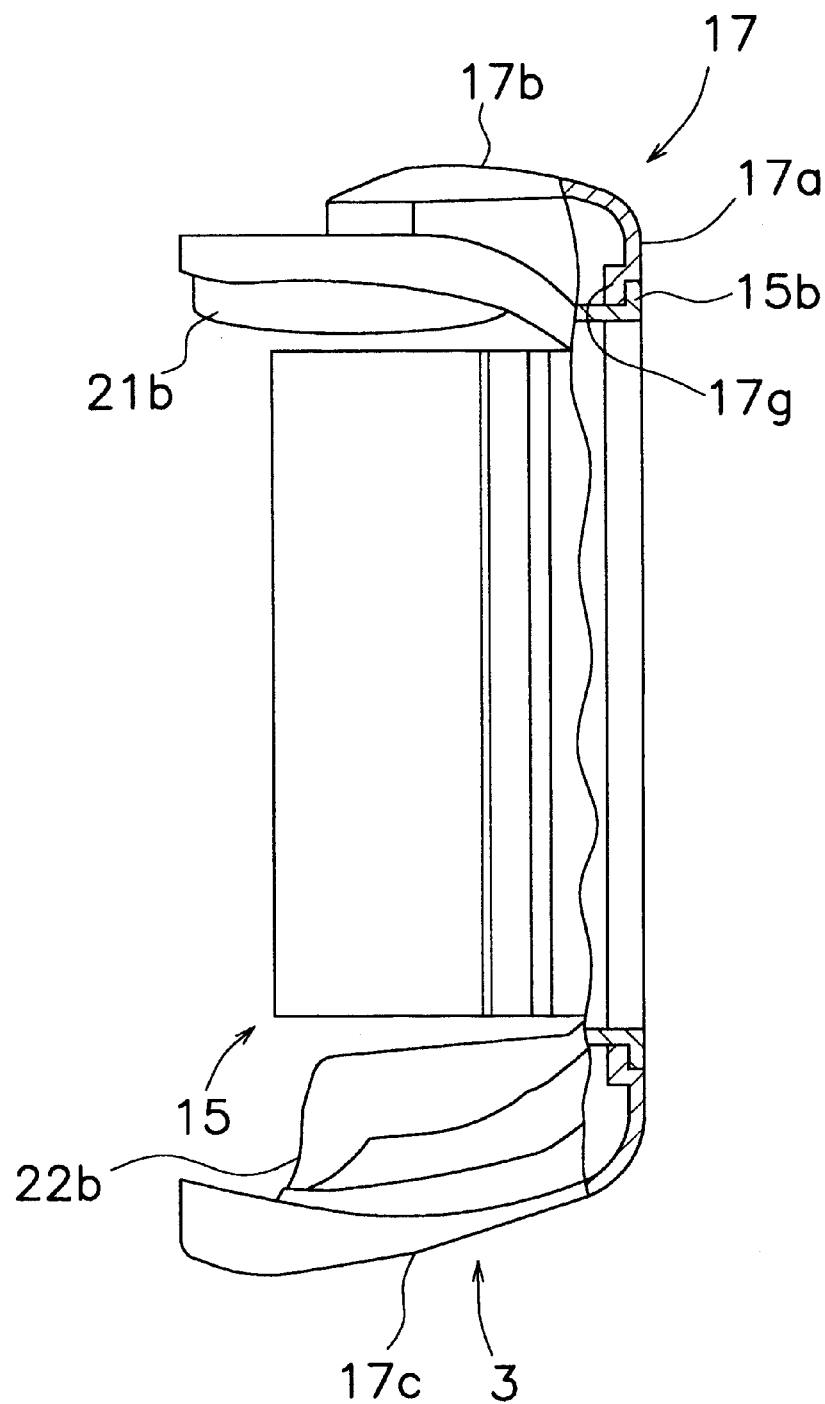
FIG. 15 is a partly in section lateral-face view of the essential portion of a rotor in another embodiment.

(g) In the above embodiment, the first cover member 17a is bolted to the rotor body with screws 32a and 32b. However, as shown in FIG. 15, an engaging part 17g formed on the first cover member 17a may be elastically press-fitted to an engaging part 15b. In this case, the first cover member is easily and securely fixed.

Figure 13:
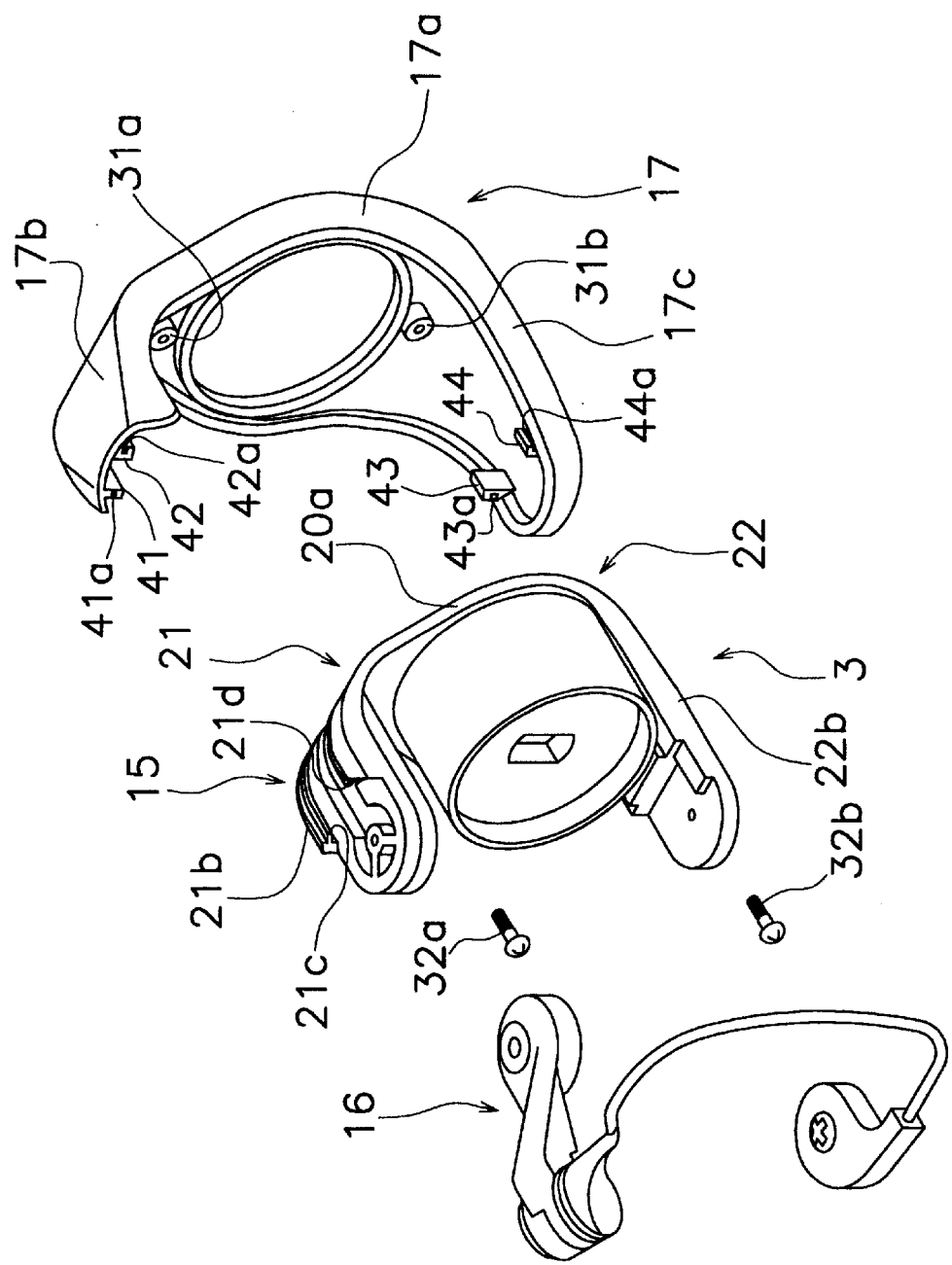
FIG. 13 is a view corresponding to FIG. 3 of another embodiment.
Figure 14:
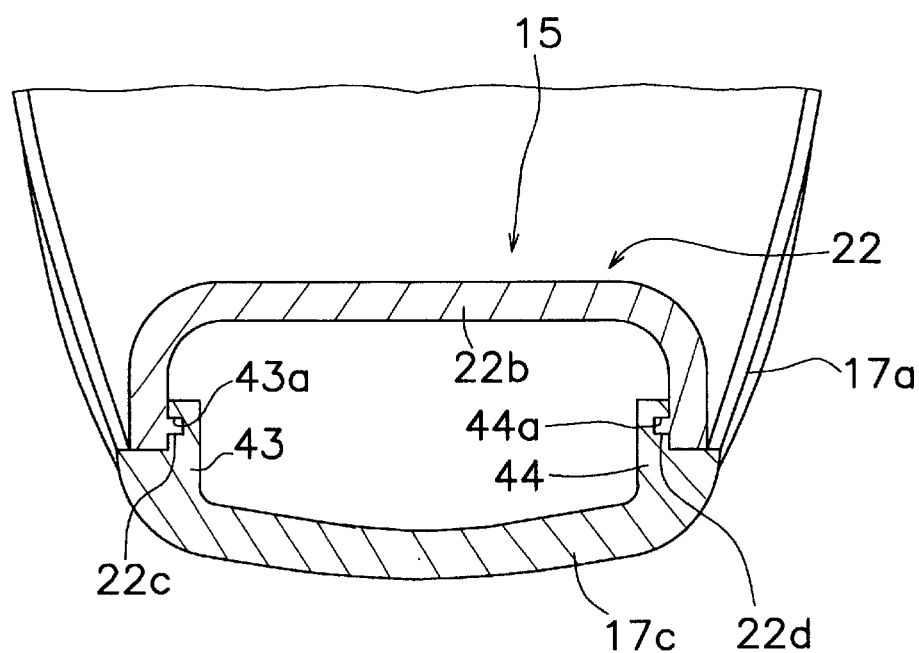
FIG. 14 is a view corresponding to FIG. 4 of the FIG. 13 embodiment.

Also, in this embodiment, the first cover member 17a is unitarily formed with the second cover members 17b and 17c. The second cover members 17b may be joined to the first arm 21b and the second arm 22b by small screws, or otherwise attached to the first arm 21b and second arm 22b by tongue-and-groove meshing as shown in FIG. 13. In case that the second cover members 17b and 17c are attached by tongue-and-groove engagement, the first cover member 17a is elastically press-fitted into the rotor body 15. The second cover members 17b and 17c unitarily formed with the first cover member 17a are tongue-and-groove meshed with the first arm 21b and the second arm 22b by sliding the second cover members. Therefore, the installation of the first cover member 17a and the second cover members 17b and 17c is much easier. The overall configuration is also simple because it is not necessary to provide screws or holes for installing them.

Figure 16:
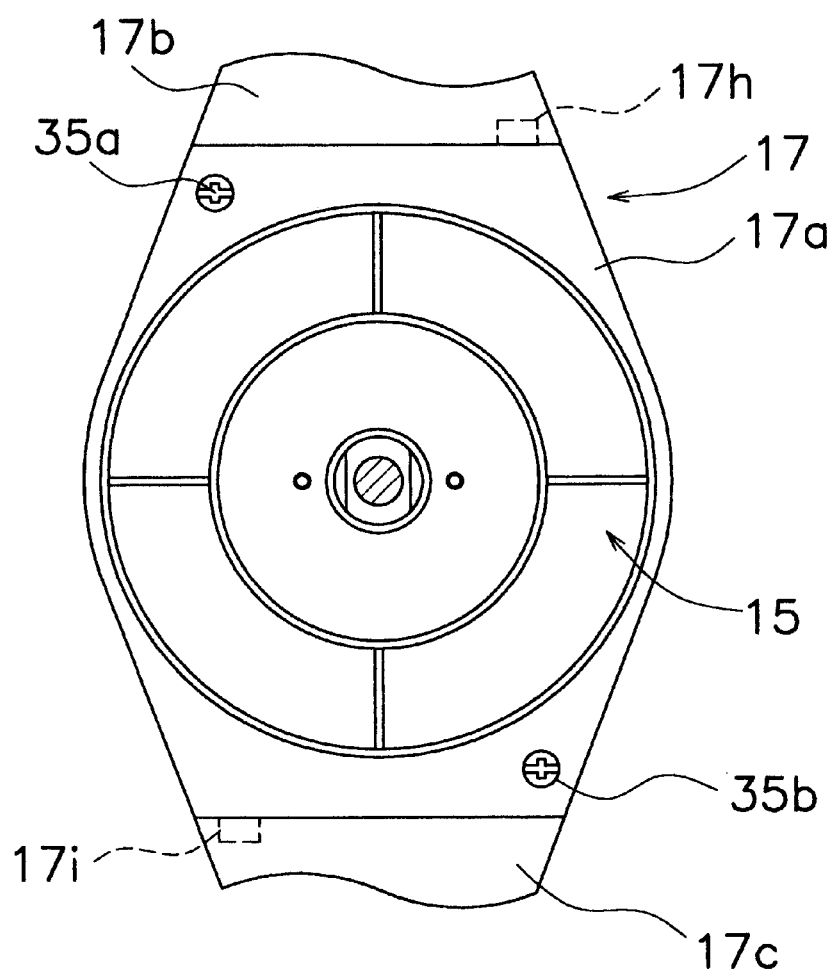
FIG. 16 is a fragmentary rear face view of the essential portion of a rotor in another embodiment.

As shown in FIG. 16, the first cover member 17a and the second cover members 17b and 17c may be formed separately, and the first cover member 17a elastically press-fitted to the rotor 15 and furthermore joined on in two places by small screws 35a and 35b. In this case, the first cover member 17a can also be fixed securely. Lift-stops 17h and 17i are formed on the first cover member 17a, respectively protruding at the sides of the second cover members 17b and 17c. During attachment of the second cover members 17b and 17c the lift-stops 17h and 17i are pressed by the second cover members 17b and 17c. In this case, lifting off due to the small screws 35a and 35b in the first cover member 17a is prevented.

Set forth in the invention, by covering at least some part of a pair of a connecting section and a rear end of a cylindrical section with the first cover member, the rotor is unlikely to be damaged. Furthermore, since the first cover member is detachable and reattachable, replacement is easily performed if the first cover member should be damaged or destroyed.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments set forth in the present invention is provided for illustration only, and not for the purpose of limiting the invention as defined by the appended claims and their equivalents.

What is claimed is:

1. A spinning reel rotor rotatively fitted to the reel body for guiding and winding fishing line onto the spinning reel spool, the spinning reel rotor comprising:

a rotor body having a cylindrical section rotatively fitted to the reel body, and a pair of rotor arms including a pair of connecting sections extending diametrically outward from opposing circumferential surface positions rear-endwise on said cylindrical section and a pair of arms bent from said pair of connecting sections and each extending forward spaced apart from said cylindrical section;

a bail arm pivotally fitted tip-endwise to said pair of rotor arms for guiding fishing line onto the spool; and a first cover member fitted so as to cover said cylindrical section rear-endwise and at least part of exterior exposed surfaces of said pair of connecting sections, and to allow detachment from and reattachment to said rotor body.

2. The spinning reel rotor set forth in claim 1, wherein:

said cylindrical section on the circumferential surface rear-endwise has a large-diameter portion diametrically larger than the rest; and said first cover member is fitted so as to cover said large-diameter portion and at least part of exterior exposed surfaces of said pair of connecting sections, and to allow detachment from and reattachment to said rotor body.

3. The spinning reel rotor set forth in claim 1, further having a pair of second cover members fitted so as to cover exterior exposed surfaces of said pair of arms, and individually to allow detachment from and reattachment to either arm.

4. The spinning reel rotor set forth in claim 3, wherein said first cover member and said pair of second cover members are formed unitarily.

5. The spinning reel rotor set forth in claim 3, wherein said first cover member and said pair of second cover members are fitted separately to said rotor body.

6. The spinning rotor set forth in claim 3, further comprising a third cover member covering said first cover member, wherein:

said first cover member and one of said pair of second cover members are formed unitarily; and said third cover member and the other of said pair of second cover members are unitarily formed.

7. The spinning reel rotor set forth in claim 3, wherein said second cover members are made of a synthetic resin polymer.

8. The spinning reel rotor set forth in claim 3, wherein said second cover member are made of a stainless steel alloy.

9. The spinning reel rotor set forth in claim 3, wherein in at least one or the other of the rotor-body covering portions of said first cover member and said second cover members, either end in widthwise cross-section intersecting the rotor-body covering portion surface protrudes more than either end widthwise of the rotor body.

10. The spinning reel rotor set forth in claim 3, wherein at least either said first cover member or said pair of second cover members is joined on from the rotor body side.

11. The spinning reel rotor set forth in claim 3, wherein at least either said first cover member or said pair of second cover members is fitted to the rotor by tongue-and-groove engagement to permit detachment and reattachment.

12. The spinning reel rotor set forth in claim 3, wherein at least either said first cover member or said pair of second cover members is attached to the rotor by elastic press-fitting engagement to permit detachment and reattachment.

13. The spinning reel rotor set forth in claim 3, wherein at least either said first cover member or said pair of second cover members is joined to the rotor in a plurality of places by stop-screws.

14. The spinning reel rotor set forth in claim 3, wherein either one of the first cover member and the pair of second cover members has a lift-stop for stopping the other of the first cover member and the pair of second cover members from lifting.

15. The spinning reel rotor set forth in claim 1, wherein said rotor body is manufactured of one selected from aluminum alloys or magnesium alloys.

16. The spinning reel rotor set forth in claim 1, wherein said first cover member is made of a synthetic resin polymer.

17. The spinning reel rotor set forth in claim 1, wherein said first cover member is made of a stainless steel alloy.

18. The spinning reel rotor set forth in claim 17, further comprising spacer members made of a dielectric synthetic resin polymer, interposed between the rotor body and at least one of the first cover member and said pair of second cover members.

19. The spinning reel rotor set forth in claim 1, wherein said first cover member is made of an aluminum alloy.

20. The spinning reel rotor set forth in claim 1, wherein said second cover member are made of an aluminum alloy.

* * * * *